US012627770B2

(12) United States Patent
El Essaili et al.

(10) Patent No.: US 12,627,770 B2
(45) Date of Patent: May 12, 2026

(54) PROVIDING A 3D REPRESENTATION OF A TRANSMITTING PARTICIPANT IN A VIRTUAL MEETING

(71) Applicant: Telefonaktiebolaget LM Ericsson (publ), Stockholm (SE)

(72) Inventors: Ali El Essaili, Aachen (DE); Natalya Tyudina, Aachen (DE); Joerg Christian Ewert, Aachen (DE); Ola Melander, Wuerselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 252 days.

(21) Appl. No.: 18/033,855

(22) PCT Filed: Jul. 7, 2021

(86) PCT No.: PCT/EP2021/068756
§ 371 (c)(1),
(2) Date: Apr. 26, 2023

(87) PCT Pub. No.: WO2022/106077
PCT Pub. Date: May 27, 2022

(65) Prior Publication Data
US 2023/0396735 A1     Dec. 7, 2023

Related U.S. Application Data

(60) Provisional application No. 63/116,424, filed on Nov. 20, 2020.

(51) Int. Cl.
*H04N 7/15*          (2006.01)
*G06V 40/10*         (2022.01)

(52) U.S. Cl.
CPC ............. *H04N 7/157* (2013.01); *G06V 40/10* (2022.01); *G06V 2201/12* (2022.01)

(58) Field of Classification Search
CPC ..... H04N 7/157; G06V 40/10; G06V 2201/12
See application file for complete search history.

(56) References Cited

U.S. PATENT DOCUMENTS 12,183,035 B1 * 12/2024 Chen ....................... G06T 19/20
2004/0133641 A1 * 7/2004 McKinnon ........ H04M 3/42365
                                                                709/204

(Continued)

FOREIGN PATENT DOCUMENTS

CN          108513088 A     9/2018
GB            2351425 A    12/2000

(Continued)

OTHER PUBLICATIONS

Japanese Notice of Reasons for Rejection issued Aug. 20, 2024, for Japanese Patent Application No. 2023-530518, 4 pages (English translation).

(Continued)

*Primary Examiner* — Phung-Hoang J Nguyen
(74) *Attorney, Agent, or Firm* — Sage Patent Group

(57) ABSTRACT

A method for providing a three-dimensional (3D) representation of a transmitting participant in a virtual meeting is provided. The method is performed in a representation provider and comprises obtaining a non-realtime 3D model of at least part of a person, obtaining partial realtime 3D data of the transmitting participant of the virtual meeting, and combining the non-realtime 3D model with the partial realtime 3D data, resulting in a combined 3D representation of the transmitting participant.

15 Claims, 8 Drawing Sheets

(56) References Cited

U.S. PATENT DOCUMENTS

| | | | | | |
|---|---|---|---|---|---|
| 2006/0239186 A1* | 10/2006 | Wu | .......................... | H04L 67/54 | |
| | | | | 370/229 | |
| 2008/0024390 A1* | 1/2008 | Baker | .................... | H04N 23/90 | |
| | | | | 345/1.3 | |
| 2008/0129844 A1* | 6/2008 | Cusack | .................. | H04N 23/80 | |
| | | | | 348/241 | |
| 2014/0072270 A1* | 3/2014 | Goldberg | ............ | G06F 3/04883 | |
| | | | | 386/223 | |
| 2015/0042743 A1 | 2/2015 | Cullen | | | |
| 2019/0297304 A1 | 9/2019 | Li | | | |
| 2020/0204655 A1* | 6/2020 | Khalid | .................... | H04L 65/70 | |
| 2021/0125398 A1* | 4/2021 | Bradley | .................... | G06T 7/70 | |
| 2021/0209835 A1* | 7/2021 | Fonseka | .................. | G06T 17/20 | |
| 2023/0066958 A1* | 3/2023 | Condorovici | ........... | G06T 7/194 | |

FOREIGN PATENT DOCUMENTS

| | | | |
|---|---|---|---|
| JP | 2000244886 A | 9/2000 | |
| JP | 2016134730 A | 7/2016 | |
| JP | 2020065229 A | 4/2020 | |

OTHER PUBLICATIONS

International Search Report and Written Opinion of the International Searching Authority for PCT International Application No. PCT/EP2021/068756 dated Oct. 13, 2021.

Zollhöfer et al., "State of the Art on Monocular 3D Face Reconstruction, Tracking, and Applications," Computer Graphics Forum : Journal of the European Association for Computer Graphics, vol. 37, No. 2, May 1, 2018 (May 1, 2018), pp. 523-550.

Lattas et al., "AvatarMe: Realistically Renderable 3D Facial Reconstruction "in-the-wild"," arXiv:2003.13845v1 [cs.CV] Mar. 30, 2020, pp. 1-10.

Feng et al., "Joint 3D Face Reconstruction and Dense Alignment with Position Map Regression Network," arXiv:1803.07835v1 [cs. CV] Mar. 21, 2018, pp. 1-18.

Taketomi et al., "Visual SLAM algorithms: a survey from 2010 to 2016," IPSJ Transactions on Computer Vision and Applications (2017) 9:16, Review Paper, Open Access, pp. 1-11.

Richard et al., "Audio- and Gaze-driven Facial Animation of Codec Avatars," arXiv:2008.05023v1 [cs.CV] Aug. 11, 2020, pp. 1-10.

* cited by examiner

PROVIDING A 3D REPRESENTATION OF A TRANSMITTING PARTICIPANT IN A VIRTUAL MEETING

CROSS-REFERENCE TO RELATED APPLICATIONS

This application is a 35 U.S.C. § 371 national stage application of PCT International Application No. PCT/EP2021/068756 filed Jul. 7, 2021, which claims the benefit of U.S. Provisional Patent Application Ser. No. 63/116,424, filed on Nov. 20, 2020, the disclosures and content of which are incorporated by reference herein in their entireties.

TECHNICAL FIELD

The present disclosure relates to a method for providing a three-dimensional (3D) representation of a transmitting participant in a virtual meeting, a representation provider for providing a 3D representation of a transmitting participant in a virtual meeting, and a computer program for providing a 3D representation of a transmitting participant in a virtual meeting.

BACKGROUND

The need for remote virtual meetings is continuously increasing. While two-dimensional (2D) video, e.g., via Microsoft Teams is common today, three-dimensional (3D) immersive communications driven by more powerful eXtended Reality (XR) devices will soon bring the user experience of virtual meetings to the next level. XR is an encompassing term for Augmented Reality (AR), Virtual Reality (VR), etc.

In order for 3D virtual meetings to work, each participant should be captured using a 3D imaging device, e.g., based on technologies such as e.g., lidar, radar, or stereo imaging. However, 3D imaging results in large amounts of data to be transferred between the user devices of the participants.

Capturing and encoding of data from 3D imaging devices, 3D streams, such as point clouds in realtime remains a challenge for virtual meetings. This is also problematic for the network with widely varying bandwidths (temporary spikes/outages) and considering the bandwidth demands of 3D captured streams. Another problem is network latency jitter that significantly impacts the conferencing experience negatively.

SUMMARY

One object is to reduce resource usage for 3D virtual meetings, in particular network resource usage such as bandwidth.

According to a first aspect, it is provided a method for providing a 3D representation of a transmitting participant in a virtual meeting. The method is performed in a representation provider. The method comprises obtaining a non-realtime 3D model of at least part of a person, obtaining partial realtime 3D data of the transmitting participant of the virtual meeting, and combining the non-realtime 3D model with the partial realtime 3D data, resulting in a combined 3D representation of the transmitting participant.

According to a second aspect, it is provided a representation provider for providing a 3D representation of a transmitting participant in a virtual meeting. The representation provider comprises a processor and a memory storing instructions that, when executed by the processor, cause the representation provider to obtain a non-realtime 3D model of at least part of a person, obtain partial realtime 3D data of the transmitting participant of the virtual meeting, and combine the non-realtime 3D model with the partial realtime 3D data, resulting in a combined 3D representation of the transmitting participant.

According to a third aspect, it is provided a computer program for providing a 3D representation of a transmitting participant in a virtual meeting. The computer program comprises computer program code which, when executed on a representation provider causes the representation provider to obtain a non-realtime 3D model of at least part of a person, obtain partial realtime 3D data of the transmitting participant of the virtual meeting, and combine the non-realtime 3D model with the partial realtime 3D data, resulting in a combined 3D representation of the transmitting participant.

According to a fourth aspect, it is provided a computer program product comprising a computer program according to the third aspect and a computer readable means on which the computer program is stored.

In the present context, partial realtime 3D data is understood to be a live camera stream representing parts of the transmitting participant, e.g., certain body parts such as the participant's head. The live camera stream is captured in realtime during the virtual meeting. A non-realtime 3D model of at least part of a person is understood to be a 3D model representing the transmitting participant, based on which a complete representation of the transmitting participant can be derived by combing the partial realtime 3D data with the non-realtime 3D model. The non-realtime 3D model is generated beforehand (non-realtime), and may be a generic model, e.g., for a human of the same gender and body type as the transmitting participant, or a model which is specific to the transmitting participant. By only transmitting partial real-time 3D data during the virtual meeting instead of a complete representation of the participant, and combing the partial real-time 3D data with a non-realtime 3D model, requirements on network bandwidth during the meeting are reduced.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

Figure 1:
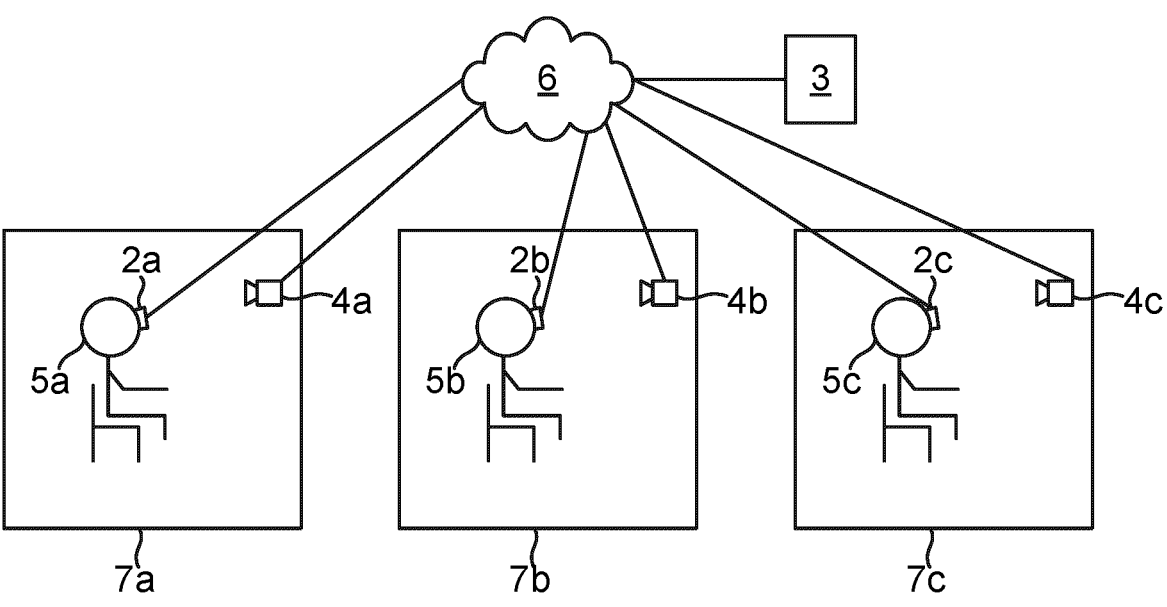
FIG. 1 is a schematic diagram illustrating an environment in which embodiments presented herein can be applied for a virtual meeting.

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein provide a resource efficient 3D representation of participants in a virtual meeting by combining partial realtime 3D data (captured in realtime by an imaging device at the transmitting participant) with a non-realtime 3D model. In contrast to prior art that rely on 3D computer-generated avatars, the embodiments presented herein provide a realistic representation of a meeting participant by augmenting a 3D model of the transmitting participant with live 3D data captured by a 3D imaging device. As full 3D captured depth images, providing a complete captured representation of the transmitting participant, are both bandwidth intensive and demanding in terms of latency, the embodiments presented herein combine partial realtime 3D data captured in realtime from a 3D imaging device with a non-realtime 3D model representation of participants to provide both a real 3D representation and reduced network requirements.

In embodiments presented herein, partial realtime 3D data (e.g., in the form of a stream) is transmitted from the 3D imaging device of a participant (denoted transmitting participant herein) to a server in the network (e.g., an edge-cloud server) in realtime where it is combined with a trained non-realtime 3D model to provide a combined 3D representation of the transmitting participant. This reduces the bandwidth requirements on the network for delivering realtime 3D data, and combines a 3D model of the participant in a server with a realtime 3D stream representing partially representing the participant to provide a complete 3D representation of the transmitting participant for rendering by the receiving user device. The non-realtime 3D model is optionally encrypted to secure privacy. The purpose is to give the transmitting participant control over how the 3D model is used, i.e., that the 3D model is not reused without consent.

Embodiments presented herein reduce realtime bandwidth and latency and latency jitter requirements on the network. Virtual meetings in 3D provide 3D immersive experience to participants compared to 2D video communications today. It is to be noted that a virtual meeting is here to be construed as any connection allowing virtual presence using 3D equipment between at least two participants, e.g., as a 3D video call, a 3D virtual business meeting, 3D virtual court hearing, etc.

The embodiments can be based on a server in a so-called edge cloud in a mobile operator domain, that in this way can provide a new service offering for virtual 3D communications and optionally secure 3D communication from an edge cloud server to a user device.

The reduced bandwidth, latency and latency jitter requirements allow the virtual 3D communication service to be offered at larger parts of the network, i.e., deeper into the network, such as at cell edges including deep indoor locations, than would otherwise be possible.

FIG. 1 is a schematic diagram illustrating an environment in which embodiments presented herein can be applied for a virtual meeting. There are a first participant 7a, a second participant 7b, and a third participant. Communication between different entities is enabled by a communication network 6. The communication network can be an Internet Protocol (IP) based network. The network can, e.g., comprise any one or more of a local wireless network, a cellular network, a wired local area network, a wide area network (such as the Internet), etc.

The first participant 5a is in a first physical space 7a (e.g., a home or an office) and has a first user device 2a, capable of rendering 3D content. For instance, the first user device 2a can be an XR device, e.g., in the form of glasses, a smartphone, or a tablet. A first 3D imaging device 4a is provided to capture 3D images of the first participant 5a. Optionally, the first 3D imaging device 4a forms part of the first user device 2a (not shown). Each one of the first user device 2a and the first 3D imaging device 4a are connected to the communication network 6, either directly (as shown) or via another local device (e.g., via the first user device 2a).

The second participant 5b is in a second physical space 7b (e.g., a home or an office) and has a second user device 2b, capable of rendering 3D content. For instance, the second user device 2b can be an XR device, e.g., in the form of glasses or a smartphone. A second 3D imaging device 4b is provided to capture 3D images of the second participant 5b. Optionally, the second 3D imaging device 4b forms part of the second user device 2b (not shown). Each one of the second user device 2b and the second 3D imaging device 4b are connected to the communication network 6, either directly (as shown) or via another local device (e.g., via the second user device 2b).

The third participant 5c is in a third physical space 7c (e.g., a home or an office) and has a third user device 2c, capable of rendering 3D content. For instance, the third user device 2c can be an XR device, e.g., in the form of glasses or a smartphone. A third 3D imaging device 4c is provided to capture 3D images of the third participant 5c. Optionally, the third 3D imaging device 4c forms part of the third user device 2c (not shown). Each one of the third user device 2c and the third 3D imaging device 4c are connected to the communication network 6, either directly (as shown) or via another local device (e.g., via the third user device 2c).

The 3D imaging devices 4a-c can be implemented using any one or combination of suitable technologies, e.g., lidar, radar, stereo imaging, etc. The output from the 3D imaging devices 4a-c can be any suitable format, e.g., point cloud, RGB (Red Green Blue)-depth, mesh, etc.

A server 3 is provided which is connected to the communication network 6. The server 3 can form part of a cloud service provided by a cloud service provider. The server 3 be implemented using a single physical computer or using multiple computers in a single location or across multiple locations.

Using the components disclosed in FIG. 1, the participants 5a, 5b, 5c can set up a virtual meeting providing visual 3D presentations of the other participants.

Figure 2:
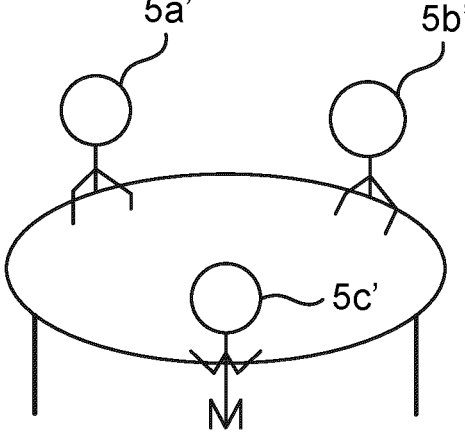
FIG. 2 is a schematic diagram illustrating a virtual meeting for the participants illustrated in FIG. 1.

FIG. 2 is a schematic diagram illustrating a virtual meeting for the participants illustrated in FIG. 1. The view in FIG. 2 is a virtual perspective view of the 3D environment of the virtual meeting, with a first representation 5a' of the first participant 5a, a second representation 5b' of the second participant 5b and third representation 5c' of the third participant 5c. In the actual rendering by the respective user devices 2a, 2b, 2c, the view is rendered as seen from the respective representation 5a', 5b', 5c'.

In the following, embodiments are presented where the representation of one participant is described. This participant is denoted the transmitting participant and the participant viewing the transmitting participant is called the receiving participant. It is to be noted, however, that all participants of the virtual meeting may be represented analogously, to all other participants. In other words, the embodiments presented herein can be applied for multiple participants, with at least one transmitting participant. In other words, a transmitting participant can be rendered on the user device of one or more receiving participants, e.g., if the transmitting participant is giving a lecture. Alternatively or additionally, two or more transmitting participants are can be rendered on the user devices of the other participants.

Figure 3:
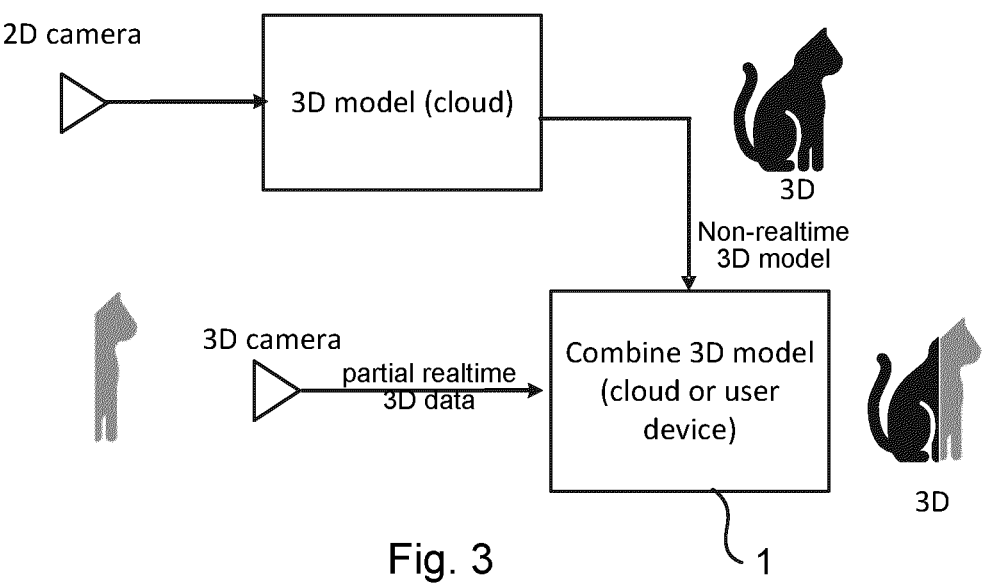
FIG. 3 is a schematic diagram illustrating an embodiment of combining 3D data where the non-realtime 3D model is based on a 2D camera source.

FIG. 3 is a schematic diagram illustrating an embodiment of 3D data combining where the non-realtime 3D model is based on a 2D camera source. This shows an embodiment which is based on combining a trained non-realtime 3D model with partial realtime 3D data. A 2D camera stream can be used to construct a non-realtime 3D model. For instance, this can be based on the method described in Feng et al "Joint 3D Face Reconstruction and Dense Alignment with Position Map Regression Network", available at https://arxiv.org/abs/1803.07835 at the time of filing this application, which discloses deriving a 3D shape of a face based on a 2D image.

Additionally, in the lower part of FIG. 3, partial realtime 3D data is transmitted over a the network to a representation provider 1 (implemented in the server 3 or the user device of the receiving participant) that combines the non-realtime 3D model with the partial realtime 3D data to generate a realistic 3D representation of the participants.

It is to be noted that the 2D camera and 3D imaging device (e.g., 3D camera) represent an image capturing systems and can be co-located in one camera or be provided in separate devices. The same applies to other embodiments described throughout this disclosure.

Figure 4:
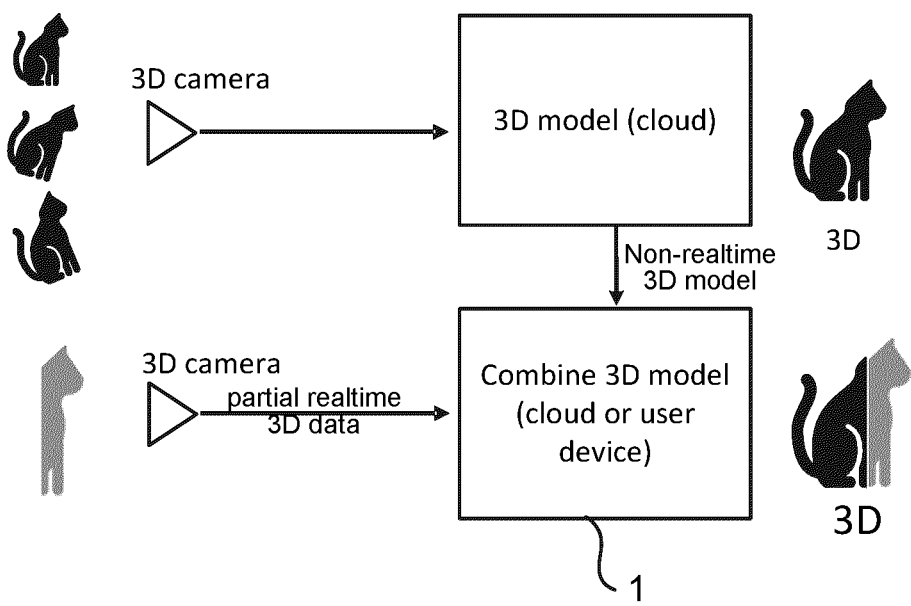
FIG. 4 is a schematic diagram illustrating an embodiment of combining 3D data where the non-realtime 3D model is based on a 3D camera source.

It is to be noted that, although a cat is shown in FIG. 3 and FIG. 4, the embodiments are primarily applied to human participants.

FIG. 4 is a schematic diagram illustrating an embodiment of 3D data combining where the non-realtime 3D model is based on a 3D imaging device source. In this embodiment, the server 3 pre-generates full 3D representations of participants and stores on a server, e.g., in an edge cloud. The generated 3D representations can be specific for each participant and generated prior to the virtual meeting. This reduces bandwidth demands during the virtual meeting. The server can additionally optimise the 3D camera stream input for generating the non-realtime 3D model (e.g., background removal). The pre-generated non-realtime 3D models can for instance capture a 3D representation of a participant from different angles. During run-time, the non-realtime 3D model is combined with partial realtime 3D data from the 3D imaging device to provide a realistic 3D representation of participants in a virtual meeting. The combining takes place in the representation provider 1, which can be implemented in the server 3 or in the user device of the receiving participant.

Figure 5:
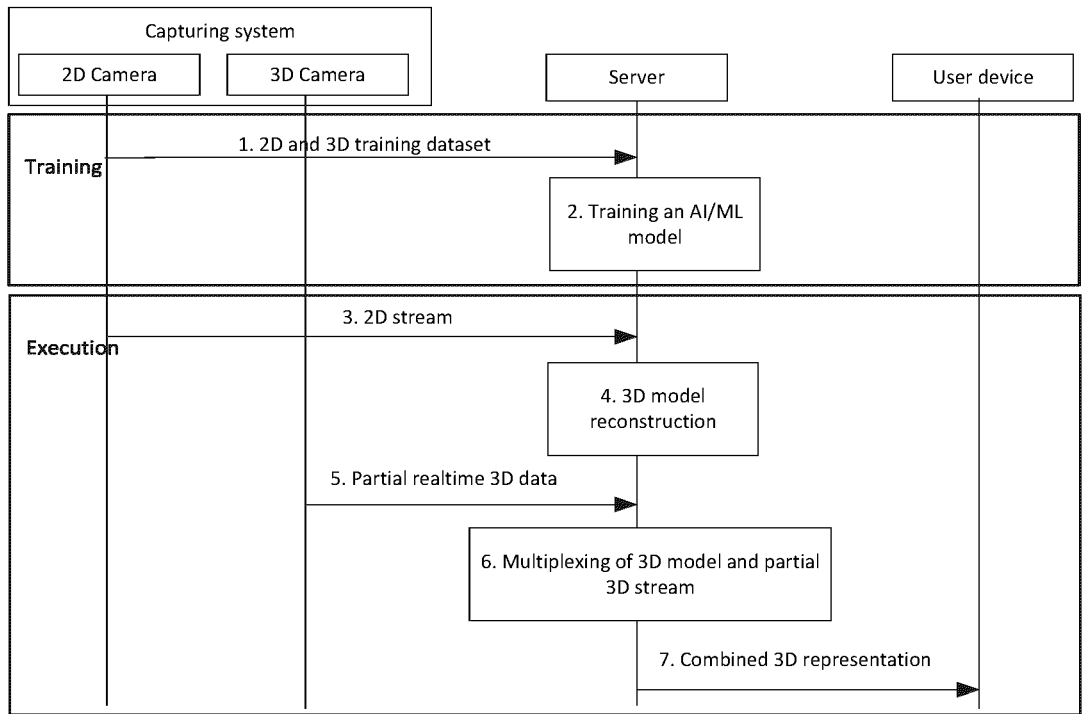
FIG. 5 is a sequence diagram illustrating a call flow for a 3D modelling embodiment where the non-realtime 3D model and the partial realtime 3D data are combined in a server.

FIG. 5 is a sequence diagram illustrating a call flow for a 3D modelling embodiment where the non-realtime 3D model and the partial realtime 3D data are combined in a server. It is to be noted that for all sequence diagrams the 'capturing system' forms part of the user device of the transmitting participant and can comprise either or both of a 2D camera and a 3D imaging device.

For the embodiment shown in FIG. 3, training and execution phases are shown. During the training phase, 2D and 3D camera streams are used to train a non-realtime 3D model by considering a large dataset of streams, e.g., point clouds including depth and texture images. A point cloud, whenever used in this disclosure, contains a set of points (e.g., as cartesian coordinates) in 3D space. The point cloud can contain large numbers of points, e.g., up to tens of thousands of points or even millions of points.

During the execution phase, a 2D camera image is used to construct a 3D model based on the trained non-realtime 3D model. In addition, partial realtime 3D data is transmitted from the 3D imaging device to the server where it is combined with the non-realtime 3D model. The combined 3D representation is provided to the user device of the recipient participant.

Figure 6:
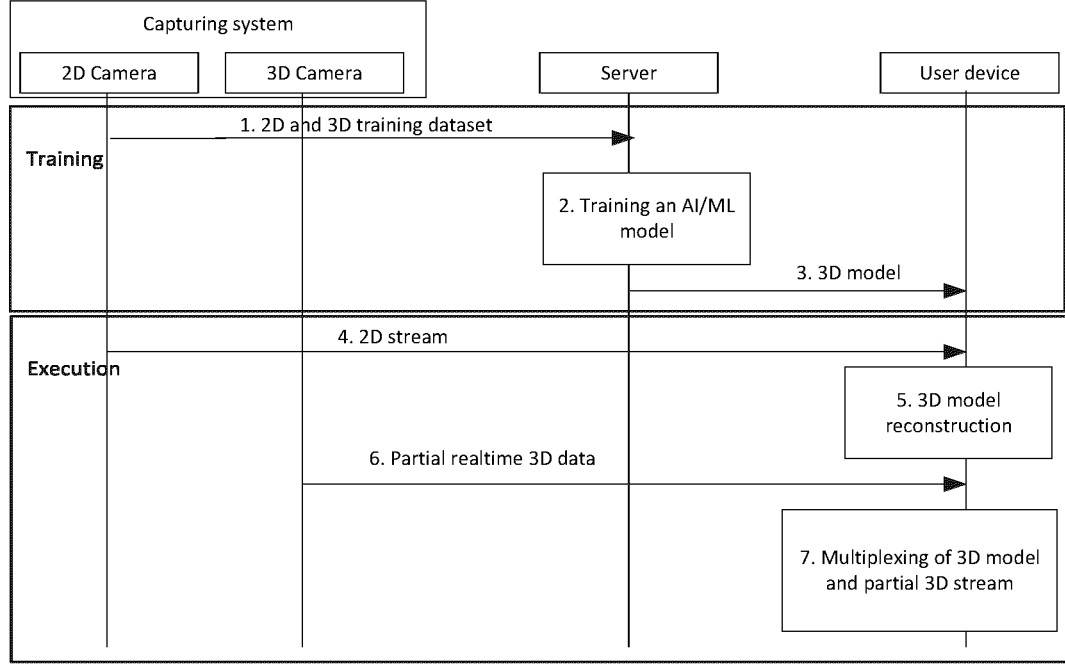
FIG. 6 is a sequence diagram illustrating a call flow for a 3D modelling embodiment where the non-realtime 3D model and the partial realtime 3D data are combined by the recipient user device.

FIG. 6 is a sequence diagram illustrating a call flow for a 3D modelling embodiment where the non-realtime 3D model and the partial realtime 3D data is combined by the recipient user device. After training, the resulting non-realtime 3D model is provided to the user device and during execution the 2D image and partial realtime 3D data are provided to the user device. The 3D model can be transferred whenever feasible in advance to the user device to reduce realtime bandwidth demands during the meeting. Whenever the 3D model is transferred in this embodiment or any other embodiment presented herein, the 3D model can be encrypted to protect privacy.

Figure 7:
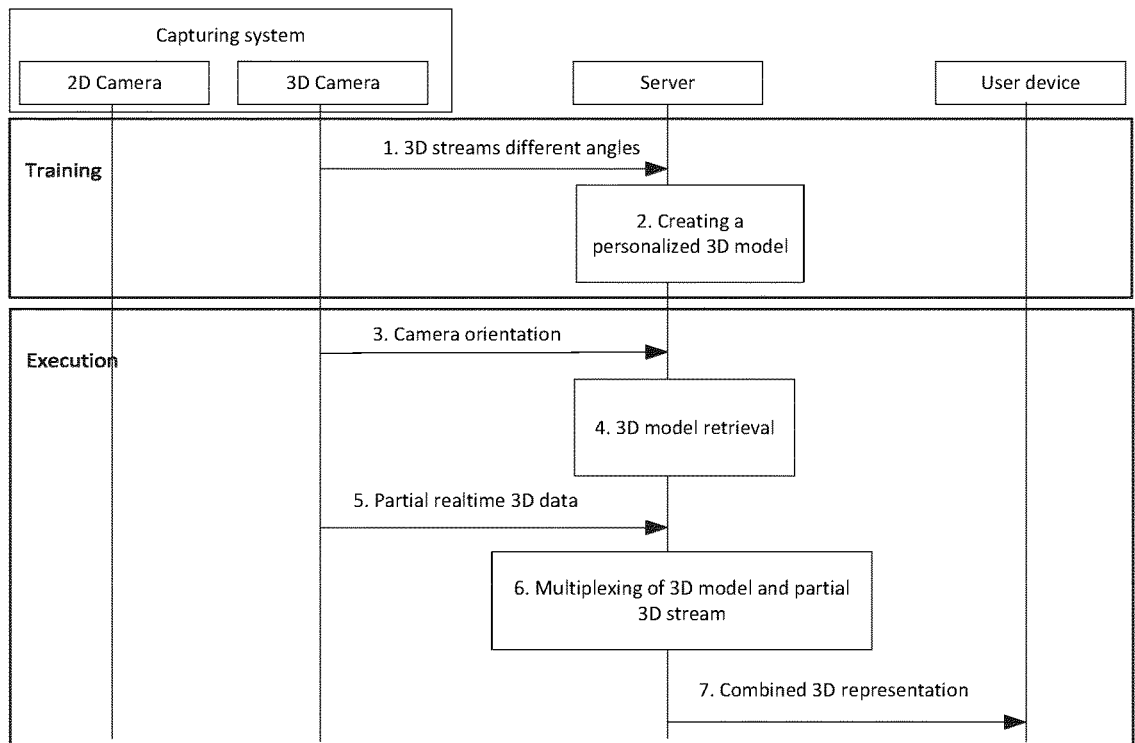
FIG. 7 is a sequence diagram illustrating a call flow for a 3D modelling embodiment where the personalised 3D model and the partial realtime 3D data are combined in the server.

FIG. 7 is a sequence diagram illustrating a call flow for a 3D modelling embodiment where the 3D personalised model and the partial realtime 3D data are combined in the server 3.

This embodiment can be combined with the embodiment of FIG. 4. During the training phase, 3D streams representing future transmitting participant from different angles are provided to the server, which builds a personalised 3D model repository for the future transmitting participant. During the execution phase, the right 3D model is selected from the server based on an orientation of the 3D imaging device and the identity of the transmitting participant. The model is combined with partial realtime 3D data received from the 3D imaging device and the combined 3D representation is provided to the user device.

Figure 8:
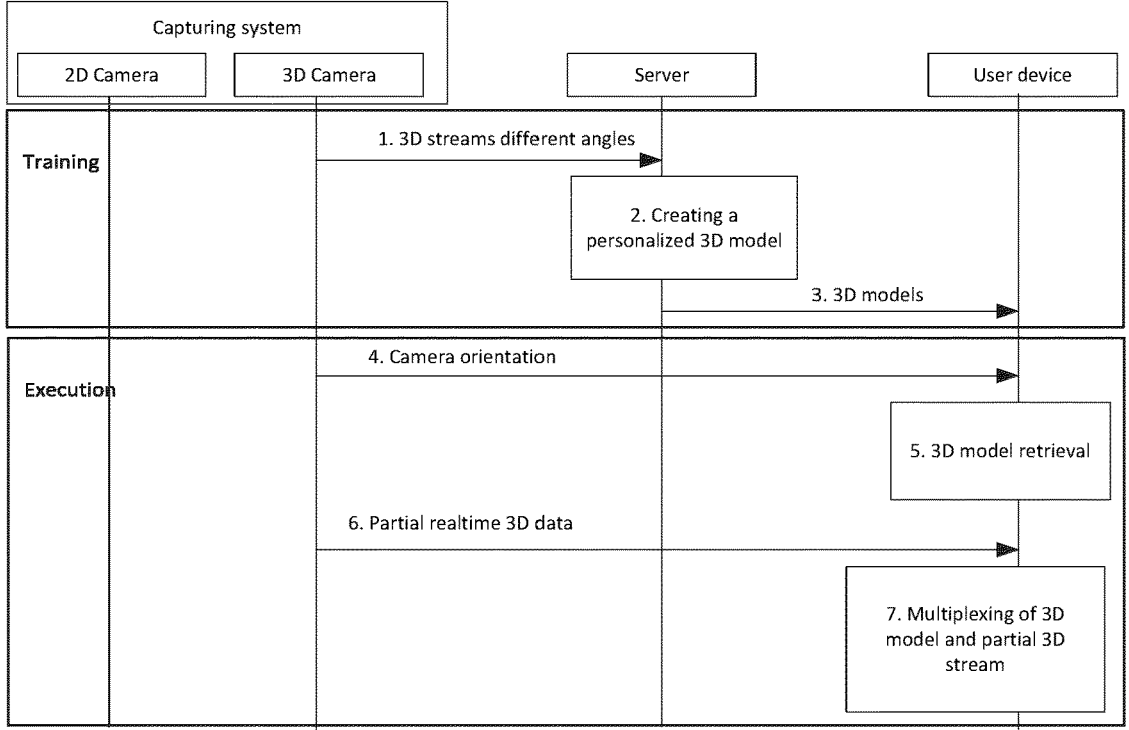
FIG. 8 is a sequence diagram illustrating a call flow for a 3D modelling embodiment where the personalised 3D model and the partial realtime 3D data are combined by the recipient user device.

FIG. 8 is a sequence diagram illustrating a call flow for a 3D modelling embodiment where the 3D personalised model and the partial realtime 3D data are combined by the recipient user device. The combining takes place in the user device of the receiving participant. The pre-generated non-realtime 3D models can be provided ahead of the virtual meeting to the user device. During the virtual meeting, the orientation of the 3D imaging device is provided to the user device to select a non-realtime 3D model and the partial realtime 3D data is provided to the user device. The combining of both non-realtime 3D model and partial realtime 3D data is executed by the user device. The non-realtime 3D model is transferred to the user device to reduce realtime bandwidth demands.

Figure 9:
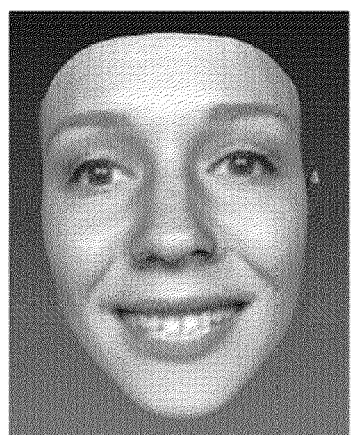
FIG. 9 illustrates a 3D model generated based on 2D image input.
Figure 9:
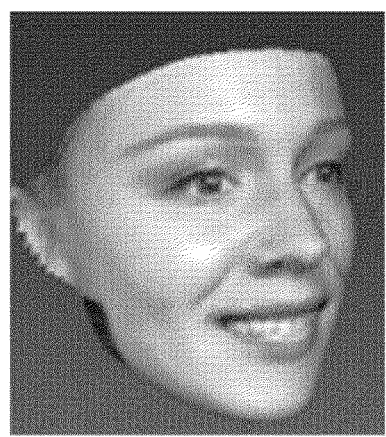
Figure 9:

FIG. 9 illustrates 3D data generated based on 2D image input. The upper part of FIG. 9 shows an output 3D model that can be generated in the representation provider 1 (in the server or user device) based on a 2D image input. The lower part of FIG. 9 shows a complete head, of a computer-modelled avatar with hair and neck.

For practical aspects, the representation of the head of a participant can be divided into sections, such as neck, face, and hair. Using this embodiment, the combined 3D representation can be animated and if needed, rotation can be adjusted based on the partial realtime 3D data.

Figure 10:
FIG. 10 illustrates partial 3D data from a point cloud.

FIG. 10 illustrates partial 3D data derived from a point cloud, illustrating face, front neck and upper torso. Note that hair is excluded in this point cloud.

Figure 11:
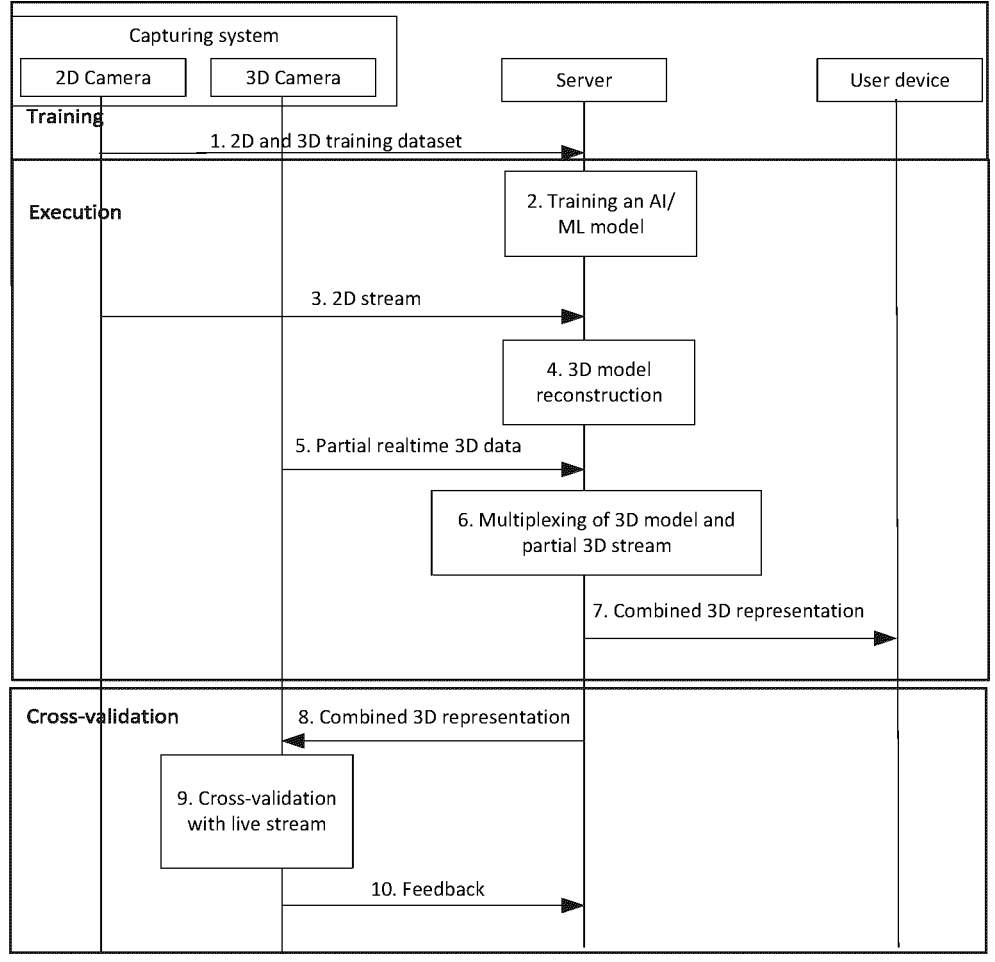
FIG. 11 is a sequence diagram illustrating a call flow for cross-validation of the combined 3D representation with live stream based on visual feedback from the server.

FIG. 11 is a sequence diagram illustrating a call flow for cross validation of a combined 3D representation with live stream based on visual feedback from the representation provider. The combined 3D representation can be provided as visual feedback from the representation provider to the capturing system, i.e., the user device of the transmitting participant. The combined 3D representation is used by the user device of the transmitting participant to cross validate the combined 3D representation with the live stream from the 3D imaging device. A feedback can be provided to the representation device. The feedback can be a simple acknowledgment of the cross validation or can also include error indications in certain areas of the stream, allowing the representation device to improve its generation of the combined 3d representation.

The cross validation can happen at the beginning of the virtual meeting, periodically, or when needed, e.g., if the error level in the combining is above a certain threshold then the generated model is sent for cross validation. It is to be noted that the cross validation can be applied for any embodiments presented herein.

Figure 12A:
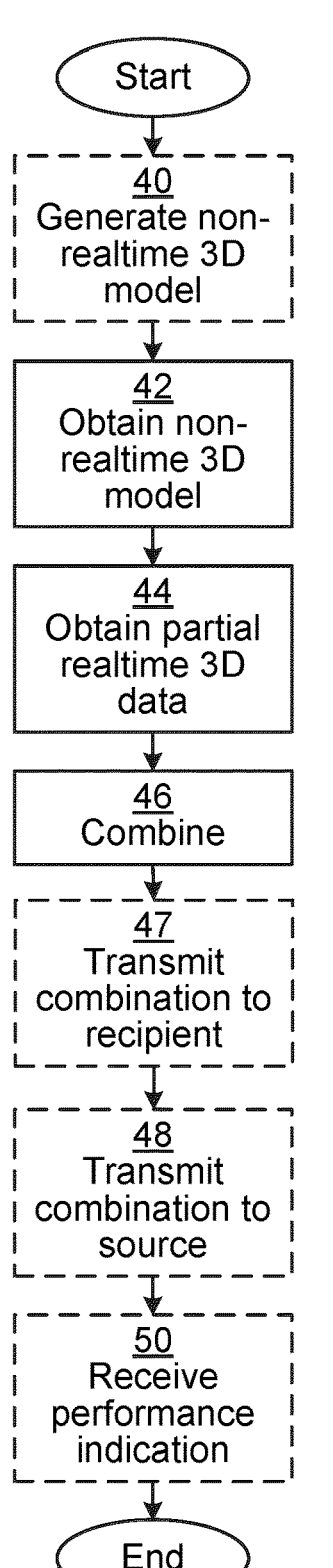
FIGS. 12A-B are flow charts illustrating embodiments of methods for providing a 3D representation of a transmitting participant in a virtual meeting.
Figure 12B:
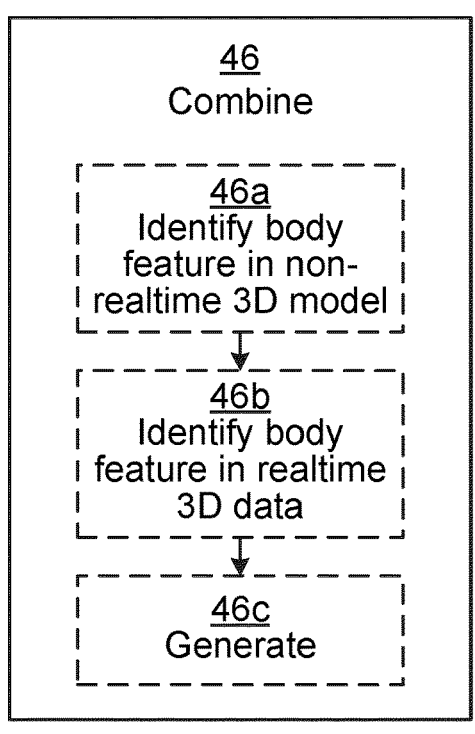

FIGS. 12A-B are flow charts illustrating embodiments of methods for providing a 3D representation of a transmitting participant in a virtual meeting. The embodiments of the methods are performed in a representation provider 1, which can be implemented in the user device of the receiving participant or in the server.

In an optional generate non-realtime 3D model step 40, the representation provider 1 generates the non-realtime 3D model based on camera data, e.g., as described above. The camera data comprises data from a 2D camera or from a 3D imaging device. The non-realtime 3D model can be adapted in conjunction with the virtual meeting, e.g., just before the meeting, e.g., as part of a set-up process. This can ensure that the non-realtime 3D model is up to date with the current appearance of the transmitting participant, e.g., haircut, clothes, make-up, suntan, light conditions, etc.

In an obtain non-realtime 3D model step 42, the representation provider 1 obtains a non-realtime 3D model of at least part of a person.

The non-realtime 3D model can be a model which is specific for the transmitting participant 5*a*.

Alternatively, the non-realtime 3D model is a model which is a general model that can be used for several different transmitting participants. In such a case, the non-realtime 3D model can be selected from a plurality of non-realtime 3D models based on characteristics of the transmitting participant 5*a*, e.g., sex, age, etc.

In an obtain partial realtime 3D data step 44, the representation provider 1 obtains partial realtime 3D data of the transmitting participant 5*a* of the virtual meeting. The partial realtime 3D data is captured by a 3D imaging device at the transmitting participant and contains 3D data depicting the transmitting participant.

In a combine step 46, the representation provider 1 combines the non-realtime 3D model with the partial realtime 3D data, resulting in a combined 3D representation of the transmitting participant 5*a*.

When realtime partial realtime 3D data is temporarily unavailable, this step can comprise combining the non-realtime 3D model with the most recently received partial realtime 3D data, and generating an appearance of the transmitting participant representing unavailability. For instance, the combined 3D representation can be generated where the transmitting participant is looking to the side, indicting non-focus of the transmitting participant. The participants will learn over time that this is an indication of network problems, indicated in an intuitive and natural manner.

Optionally, the representation provider 1 forms part of a server 3. In this case, in an optional transmit combination to recipient step 47, the representation provider 1 transmits the combined 3D representation to a user device 2*a* of the receiving participant, for rendering by that user device 2*a* for the receiving participant.

In an optional transmit combination to source step 48, the representation provider 1 transmits the combined 3D representation to a user device 2*a* of the transmitting participant. This allows the user device of the transmitting participant render the combined representation for the transmitting participant, allowing the transmitting participant to view their visual representation as seen by the receiving participant. The visual representation includes effects of communication, e.g., due to variations in network quality. For example, the transmitting participant can see when the receiving participant observes unavailability of the transmitting participant. Optionally, an indication of successful rendering and/or successful combined 3D representation is provided to the user device of the transmitting participant.

In an optional receive performance indication step 50, the representation provider 1 receives a performance indication from the user device 2*a* of the transmitting participant.

Looking now to FIG. 12B, this is a flow chart illustrating optional sub-steps of the combine step 46.

In an optional identify body feature in non-realtime 3D model sub-step 46*a*, the representation provider 1 identifies at least one body feature in the non-realtime 3D model. Such body features can, e.g., be any one or more of neck, eye, lips, mouth opening, face, hair, etc.

In an optional identify body feature in realtime 3D data sub-step 46b, the representation provider 1 identifies at least one body feature in the realtime 3D data.

In an optional generate sub-step 46c, the representation provider 1 generates the combined 3D representation of the transmitting participant 5a based on both the non-realtime 3D model and the realtime 3D data. In this generation, for body features forming part of both the non-realtime 3D model and the realtime 3D data, here denoted common body features, more consideration is given to the realtime 3D data. This can be implemented by applying different weights to the non-realtime 3D model and the realtime 3D data. Optionally, more consideration is applied to the realtime 3D data when network bandwidth decreases.

For common body features, higher weights can be assigned for realtime 3D data (critical information around the face, e.g., can be prioritised).

It is also possible that the weighting is based on the quality of the partial realtime 3D data such as only the partial realtime 3D data is used for these areas when the quality of the partial realtime 3D data is very high, and partial realtime 3D data skipped or reduced when the quality is low or during outages when no partial realtime 3D data is received.

For sections, e.g., body parts, where only the non-realtime 3D model contributes, only data from the non-realtime 3D model is used for generating the combined 3D representation.

The combining of the non-realtime 3D model and the partial realtime 3D data in the combine step 46 can happen in different ways such as overlaying of point cloud coordinates from both the 3D model and the partial realtime 3D data. This can include a number of optional steps to improve the combining.

In one embodiment, sections in the partial realtime 3D data which correspond to specific body features of the participant are identified in pre-processing, by the server or by the camera. Such sections are detailed alongside the partial realtime 3D data, e.g., as auxiliary data. Such sections can, e.g., correspond to areas which are considered highly important for a visual experience such as areas around the eyes or mouth.

Optionally, when performed in the server, the combination is also based on connectivity to the user device of the receiving user. For instance, when network connectivity is good, a full 3D representation, based on common and uncommon parts is generated and transmitted, while when network conditions are worse, only the combined common parts are sent.

When the combining takes place in the user device, the combining can depend on the processing and energy requirements of the user device. The combining can also depend on communication capabilities, such as the extent of content in the realtime 3D data.

The combining can be automated, e.g., by employing a trained Machine Learning (ML)/Artificial Intelligence (AI) model which can be executed in realtime.

The combined 3D representation is displayed on the user device of the receiving participant, allowing receiving participant to visualize the transmitting participant in a combination of realtime 3D data and non-realtime 3D model.

As described above, the representation provider can be implemented as part of a user device of a receiving participant, and, as explained above, the user device of the receiving participant can be an XR device.

Using embodiments presented herein, 3D capturing, e.g., using point clouds, can be deployed without the challenges of immense bandwidth requirements of the prior art. Moreover, point cloud compression standards are not used, since these are not well suited for realtime communications.

Moreover, some of the embodiments presented herein are based on the most relevant part of realtime 3D data, captured of the transmitting participant. Such a solution results in greatly improved quality compared to 2D to 3D conversion.

Figure 13:
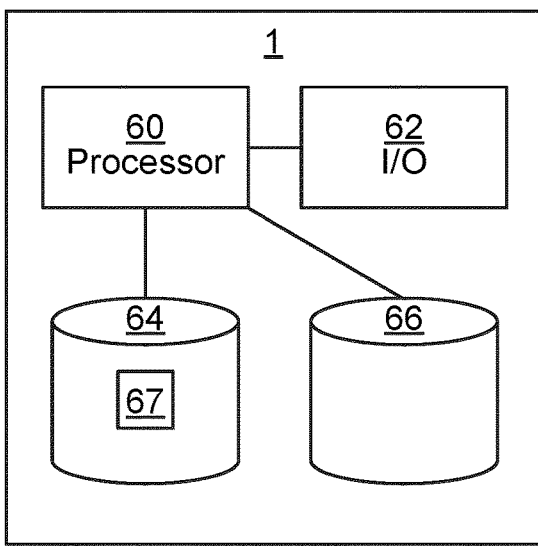
FIG. 13 is a schematic diagram illustrating components of the representation provider.

FIG. 13 is a schematic diagram illustrating components of the representation provider 1. It is to be noted that, when implemented as part of a host device (e.g., the server 3 or the receiving user device 2b), one or more of the mentioned components can be shared with a host device. A processor 6o is provided using any combination of one or more of a suitable Central Processing Unit (CPU), Graphics Processing Unit (GPU), multiprocessor, microcontroller, Digital Signal Processor (DSP), etc., capable of executing software instructions 67 stored in a memory 64, which can thus be a computer program product. The processor 6o could alternatively be implemented using an Application Specific Integrated Circuit (ASIC), Field Programmable Gate Array (FPGA), etc. The processor 6o can be configured to execute the method described with reference to FIGS. 12A-B above.

The memory 64 can be any combination of Random-Access Memory (RAM) and/or Read-Only Memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 6o. The data memory 66 can be any combination of RAM and/or ROM.

The representation provider 1 further comprises an I/O interface 62 for communicating with external and/or internal entities. Optionally, the I/O interface 62 also includes a user interface.

Other components of the representation provider 1 are omitted in order not to obscure the concepts presented herein.

Figure 14:
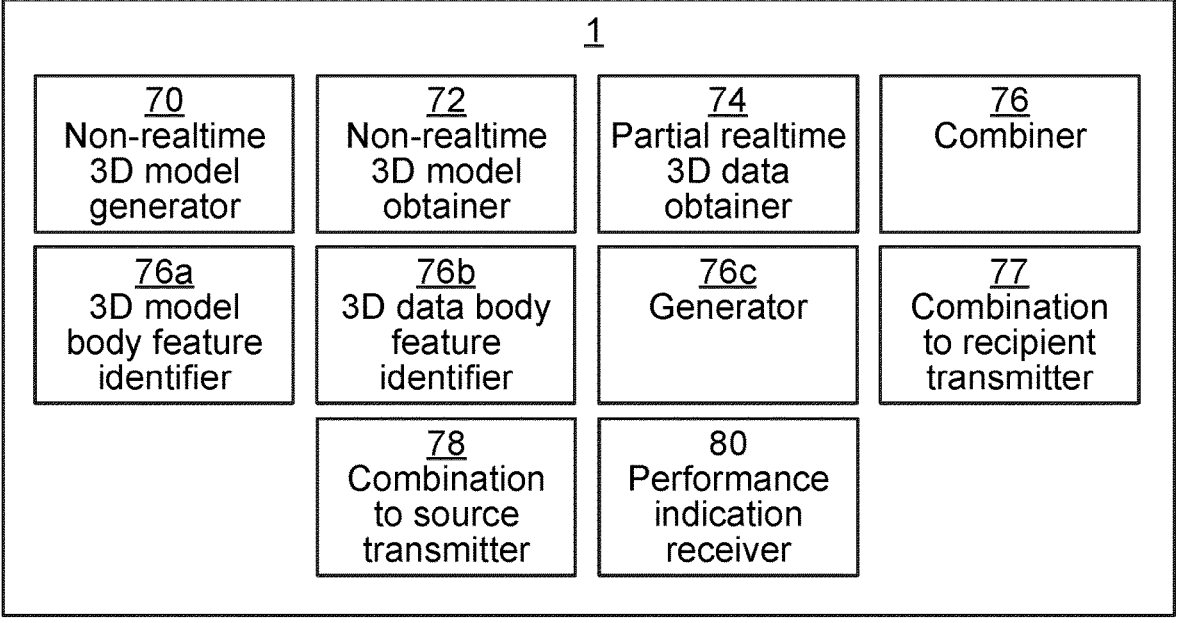
FIG. 14 is a schematic diagram showing functional modules of the representation provider 1 of FIG. 13 according to an embodiment.

FIG. 14 is a schematic diagram showing functional modules of the representation provider 1 of FIG. 13 according to one embodiment. The modules are implemented using software instructions such as a computer program executing in the representation provider 1. Alternatively or additionally, the modules are implemented using hardware, such as any one or more of an Application Specific Integrated Circuit (ASIC), a Field Programmable Gate Array (FPGA), or discrete logical circuits. The modules correspond to the steps in the methods illustrated in FIGS. 12A and 12B.

A non-realtime 3D model generator 70 corresponds to step 4o. A non-realtime 3D model obtainer 72 corresponds to step 42. A partial realtime 3D data obtainer 74 corresponds to step 44. A combiner 76 corresponds to step 46. A 3D model body feature identifier 76a corresponds to sub-step 46a. A 3D data body feature identifier 76b corresponds to sub-step 46b. A generator 76c corresponds to sub-step 46c. A combination to recipient transmitter 77 corresponds to step 47. A combination to source transmitter 78 corresponds to step 48. A performance indication receiver 8o corresponds to step 50.

Figure 15:
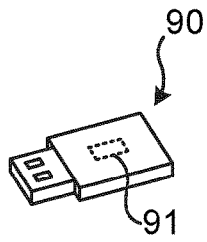
FIG. 15 shows an example of a computer program product comprising computer readable means.

FIG. 15 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g., a Universal Serial Bus (USB) drive. As explained above, the computer program product could also be embodied in a memory of a device, such as the computer program product 64 of FIG. 13. While the computer program 91 is here schematically shown as a section of the removable solid-state memory, the computer program can be stored in any way which is suitable for the computer program product, such as another type of removable solid-state memory, or an optical disc, such as a Compact Disc (CD), a Digital Versatile Disc (DVD) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for providing a three-dimensional, 3D, representation of a transmitting participant in a virtual meeting, the method being performed in a representation provider, the method comprising:

obtaining a live camera stream representing parts of the transmitting participant of the virtual meeting;

based on a characteristic of the transmitting participant in the obtained live camera stream, selecting a non-realtime 3D model from a plurality of non-realtime 3D models that are general models that can be used for several different transmitting participants;

identifying at least one body feature in the non-realtime 3D model;

identifying at least one body feature in the live camera stream; and generating a combined 3D representation of the transmitting participant based on both the non-realtime 3D model and the live camera stream, wherein generating the combined 3D representation further comprises, when the live camera stream is temporarily unavailable, combining the non-realtime 3D model with the most recently received live camera stream, and generating an appearance of the transmitting participant representing unavailability.

2. The method according to claim 1, further comprising:

generating the non-realtime 3D model based on camera data.

3. The method according to claim 1, wherein generating the combined 3D representation comprises, for body features forming part of both the non-realtime 3D model and the live camera stream, assigning higher weights to data included in the live camera stream than data included in the non-realtime 3D model.

4. The method according to claim 1, further comprising:

transmitting the combined 3D representation to a user device of the transmitting participant.

5. The method according to claim 4, further comprising:

receiving a performance indication from the user device of the transmitting participant.

6. The method according to claim 1, wherein the representation provider forms part of a user device of a receiving participant.

7. The method according to claim 6, wherein the user device of the receiving participant is an extended reality, XR, device.

8. The method according to claim 1, wherein the representation provider forms part of a server.

9. The method according to claim 8, further comprising:

transmitting the combined 3D representation to a user device of a receiving participant.

10. A representation provider for providing a three-dimensional, 3D, representation of a transmitting participant in a virtual meeting, the representation provider comprising:

a processor; and a memory storing instructions that, when executed by the processor, cause the representation provider to:

obtain a live camera stream representing parts of the transmitting participant of the virtual meeting;

based on a characteristic of the transmitting participant in the obtained live camera stream, select a non-realtime 3D model from a plurality of non-realtime 3D models that are general models that can be used for several different transmitting participants;

identify at least one body feature in the non-realtime 3D model;

identify at least one body feature in the live camera stream; and generate a combined 3D representation of the transmitting participant based on both the non-realtime 3D model and the live camera stream, wherein generating the combined 3D representation further comprises, when the live camera stream is temporarily unavailable, combining the non-realtime 3D model with the most recently received live camera stream, and generating an appearance of the transmitting participant representing unavailability.

11. The representation provider according to claim 10, further comprising instructions that, when executed by the processor, cause the representation provider to:

generate the non-realtime 3D model based on camera data.

12. The representation provider according to claim 10, wherein generating the combined 3D representation comprises, for body features forming part of both the non-realtime 3D model and the live camera stream, assigning higher weights to data included in the live camera stream than data included in the non-realtime 3D model.

13. The representation provider according to claim 10, further comprising instructions that, when executed by the processor, cause the representation provider to:

transmit the combined 3D representation to a user device of the transmitting participant.

14. The representation provider according to claim 13, further comprising instructions that, when executed by the processor, cause the representation provider to:

receive a performance indication from the user device of the transmitting participant.

15. A computer program product for providing a 3D, three-dimensional, representation of a transmitting participant in a virtual meeting, the computer program product comprising a non-transitory computer readable medium storing instructions which, when executed by a processor of a representation provider causes the representation provider to:

obtain a live camera stream representing parts of the transmitting participant of the virtual meeting;

based on a characteristic of the transmitting participant in the obtained live camera stream, select a non-realtime 3D model from a plurality of non-realtime 3D models that are general models that can be used for several different transmitting participants;

identify at least one body feature in the non-realtime 3D model;

identify at least one body feature in the live camera stream; and generate a combined 3D representation of the transmitting participant based on both the non-realtime 3D model and the live camera stream, wherein generating the combined 3D representation further comprises, when the live camera stream is temporarily unavailable, combining the non-realtime 3D model with the most recently received live camera stream, and generating an appearance of the transmitting participant representing unavailability.

* * * * *